United States Patent
Rabasco et al.

(10) Patent No.: US 11,629,242 B2
(45) Date of Patent: Apr. 18, 2023

(54) FORMULATION OF A RHEOLOGY MODIFIER AND A THERMOPLASTIC-EPOXY HYBRID LATEX

(71) Applicant: Rohm and Haas Company, Collegeville, PA (US)

(72) Inventors: John J. Rabasco, Allentown, PA (US); Wenqin Wang, Phoenixville, PA (US)

(73) Assignee: Rohm and Haas Company, Collegeville, PA (US)

( * ) Notice: Subject to any disclaimer, the term of this patent is extended or adjusted under 35 U.S.C. 154(b) by 316 days.

(21) Appl. No.: 16/937,097

(22) Filed: Jul. 23, 2020

(65) Prior Publication Data
US 2021/0040291 A1 Feb. 11, 2021

Related U.S. Application Data

(60) Provisional application No. 62/884,881, filed on Aug. 9, 2019.

(51) Int. Cl.
| | |
|---|---|
| C08K 13/02 | (2006.01) |
| C09D 7/43 | (2018.01) |
| C08L 63/00 | (2006.01) |
| C09D 133/04 | (2006.01) |
| C09D 163/00 | (2006.01) |
| C09D 175/04 | (2006.01) |
| C09D 7/65 | (2018.01) |

(52) U.S. Cl.
CPC ............. *C08K 13/02* (2013.01); *C08L 63/00* (2013.01); *C09D 7/43* (2018.01); *C09D 133/04* (2013.01); *C09D 163/00* (2013.01); *C09D 175/04* (2013.01); *C08K 2201/013* (2013.01); *C09D 7/65* (2018.01)

(58) Field of Classification Search
CPC ............... C09D 7/43; C09D 175/04; C09D 133/00–26; C09D 163/00–10; C08L 75/04; C08L 33/00–26; C08L 63/00–10
See application file for complete search history.

(56) References Cited

U.S. PATENT DOCUMENTS

| | | | | |
|---|---|---|---|---|
| 4,079,028 A | * | 3/1978 | Emmons | A61K 47/34 528/68 |
| 4,155,892 A | | 5/1979 | Emmons et al. | |
| 5,594,087 A | * | 1/1997 | K onig | C08G 18/10 528/85 |
| 6,107,394 A | * | 8/2000 | Broadbent | C08L 71/02 524/840 |
| 8,658,742 B2 | | 2/2014 | Dombrowski et al. | |
| 2012/0101223 A1 | * | 4/2012 | Rabasco | C08G 18/7843 524/590 |
| 2015/0299375 A1 | | 10/2015 | Sakamoto et al. | |

\* cited by examiner

*Primary Examiner* — Kregg T Brooks
(74) *Attorney, Agent, or Firm* — Reid S. Willis

(57) ABSTRACT

The present invention relates to a composition comprising a hydrophobically modified alkylene oxide polymer having a hydrophobic portion characterized by the following group:

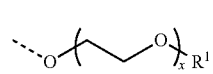

I where $R^1$ and x are as defined herein; and a) an aqueous dispersion of thermoplastic polymer particles imbibed with a thermosettable compound functionalized with structural units of an anti-agglomerating monomer; and/or b) a curing agent. The composition of the present invention is useful for improving Brookfield viscosity and sag resistance in coatings arising from, for example, 2-component acrylic-epoxy hybrid systems cured with a curing agent.

10 Claims, No Drawings

FORMULATION OF A RHEOLOGY MODIFIER AND A THERMOPLASTIC-EPOXY HYBRID LATEX

BACKGROUND OF THE INVENTION

The present invention relates to a composition comprising a rheology modifier and thermoplastic-epoxy hybrid latex for coating applications.

Two-component acrylic epoxy hybrid (2K-AEH) latexes containing amine curing agents are used in a variety of industrial coating applications including metal coatings for rail cars and freight containers. Currently, rheology modifiers used in a formulated 2K-AEH system do not meet the sag resistance and corrosion/blister resistance requirements necessary for such applications. It would be advantageous to provide a rheology modifier that exhibits sag resistance rating of ≥14 mil at KU <95 while maintaining good corrosion and blistering resistance for the coating. It would also be advantageous if the rheology modifier could be used in high gloss formulations.

SUMMARY OF THE INVENTION

The present invention addresses a need in the art by providing a composition comprising a1) an aqueous dispersion of thermoplastic polymer particles imbibed with a thermosettable compound having at least two oxirane groups, which polymer particles are functionalized with from 0.1 to 5 weight percent structural units of an anti-agglomerating monomer, and/or a2) a curing agent; and b) a hydrophobically modified alkylene oxide polymer having a hydrophobic portion characterized by the following group:

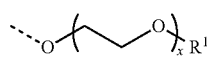

I where $R^1$ is $C_8$-$C_{32}$-alkyl; and x is from 10 to 200; and wherein the hydrophobically modified alkylene oxide polymer has a weight average molecular weight in the range of from 40,000 to 200,000 g/mol; wherein the weight-to-weight ratio of the imbibed thermoplastic polymer particles to the hydrophobically modified alkylene oxide copolymer is in the range of from 10:1 to 200:1. The composition of the present invention is useful for improving Brookfield viscosity and sag resistance in coatings arising from, for example, 2K-AEH systems cured with a curing agent.

DETAILED DESCRIPTION OF THE INVENTION

In one aspect, the present invention is a composition comprising a1) an aqueous dispersion of thermoplastic polymer particles imbibed with a thermosettable compound having at least two oxirane groups, which polymer particles are functionalized with from 0.1 to 5 weight percent structural units of an anti-agglomerating monomer, and/or a2) a curing agent; and b) a hydrophobically modified alkylene oxide copolymer having a hydrophobic portion characterized by the following group:

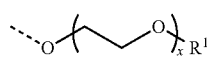

I where $R^1$ is $C_8$-$C_{32}$-alkyl; and x is from 10 to 200; and wherein the hydrophobically modified alkylene oxide polymer has a weight average molecular weight in the range of from 40,000 to 200,000 g/mol; wherein the weight-to-weight ratio of the imbibed thermoplastic polymer particles to the hydrophobically modified alkylene oxide polymer is in the range of from 10:1 to 200:1.

The aqueous dispersion of thermoplastic polymer particles are imbibed with a thermosettable compound having at least two oxirane groups. As used herein, "imbibed" means that the thermosettable compound is partitioned into the thermoplastic polymer particles but substantially unreactive therewith in the absence of a curing agent. The concentration of imbibed thermosettable compound is preferably in the range of from 20, more preferably from 25 weight percent, to 60, more preferably to 40 weight percent, based on the weight of the thermoplastic polymer particles and the thermosettable compound.

The thermosettable compound is preferably a novolac resin, a di-, tri- or tetraglycidyl ether or a di-, or tri- or tetraglycidyl ester. Examples of suitable thermosettable compounds include the diglycidyl ether of bisphenol A, the diglycidyl ether of bisphenol F, 1,4-butanediol diglycidyl ether, 1,6-hexanediol diglycidyl ether, the diglycidyl ester of phthalic acid, 1,4-cyclohexanedmethanol diglycidyl ether, 1,3-cyclohexanedmethanol diglycidyl ether, the diglycidyl ester of hexahydrophthalic acid, and novolac resins, and combinations thereof. A commercially available thermosettable compound is D.E.R. 331 Liquid Epoxy Resin.

Aqueous dispersions of the thermoplastic polymer particles can be achieved through free radical emulsion or suspension addition polymerization or by dispersion of a pre-formed polymer under shear into an aqueous medium. Examples of suitable latexes include acrylic, styrene-acrylic, styrene-butadiene, urethane, ester, olefin, vinyl chloride, ethylene vinyl acetate, and polyvinyl acetate based latexes, with acrylic and styrene-acrylic latexes being preferred. Examples of monomers suitable for the preparation of acrylic and styrene-acrylic latexes include styrene, methyl methacrylate, 2-ethylhexyl acrylate, butyl acrylate, ethyl acrylate, cyclohexyl methacrylate, isobornyl methacrylate, butyl methacrylate, isobutyl methacrylate, t-butyl methacrylate, ureido methacrylate, and acrylonitrile.

Critically, the thermoplastic polymer particles are functionalized with from 0.1, preferably from 0.2, and more preferably from 0.5 weight percent, to 5, preferably to 3, and most preferably to 2 weight percent anti-agglomerating groups, based on the weight of the thermoplastic polymer particles. The anti-agglomerating groups are advantageously incorporated into the polymer particles by copolymerization of anti-agglomerating monomers; it would also be possible to incorporate such groups by grafting. The anti-agglomerating groups are believed to be effective because they are hydrophilic as well as non-reactive with oxirane groups under heat-age conditions. The general class of such groups includes amide groups, acetoacetoxy groups, and strong protic acids, which are pH adjusted to form their conjugate bases.

Classes of suitable anti-agglomerating monomers include sulfur acid monomers and salts thereof; phosphorus acid monomer and salts thereof; acrylamide monomers; and acetoacetoxy containing monomers. Examples of such monomers include acrylamide, phosphoethyl methacrylate and salts thereof, sodium styrene sulfonate and salts thereof, acetoacetoxyethyl methacrylate, and acrylamido-methyl-propane sulfonate and salts thereof.

It is preferred that the thermoplastic polymer particles not be functionalized with carboxylic acid groups, although it has been discovered that some amount of carboxylic acid functionalization is permissible provided the polymer contains sufficient levels of anti-agglomerating groups and the pH is sufficiently high to maintain latex stability under heat-age conditions. Preferably, the concentration of carboxylic acid groups is not greater than 5, more preferably not greater than 3, and most preferably not greater than 1 weight percent based on the weight of the thermoplastic polymer particles.

The aqueous dispersion of thermoplastic polymer particles is advantageously prepared separately from the thermosettable compound using conventional emulsion polymerization techniques, then combined with the thermosettable compound, which can be neat or in the form of an aqueous dispersion, preferably as an aqueous dispersion, more preferably as a micronized aqueous dispersion. When the thermosettable compound is added as an aqueous dispersion, the emulsion is stabilized with a stabilizing amount of a surfactant, preferably at a concentration in the range of about 0.5 to about 5% by weight. Nonionic surfactants are preferred, including APEO free, non-ionic wetting agents such as polyalkylene oxide block copolymers, polyoxyethylene glycol alkyl ethers, glucoside alkyl ethers, fatty acid esters, glycerol alkyl esters, sorbitan alkyl esters, and polyoxyethylene glycol alkylphenol ethers, including commercially available wetting agents such as TRITON X-405 Octylphenol Ethoxylate (A trademark of Dow, Inc. or its Affiliates). When the thermosettable compound is combined with the aqueous dispersion of the thermoplastic polymer particles as a neat compound, imbibing is facilitated by agitation at or above room temperature. A commercially available aqueous dispersion of imbibed thermoplastic polymer particles is MAINCOTE™ AEH-10 Resin (A trademark of Dow, Inc. or its Affiliates).

The imbibed thermoplastic polymer particles typically have a volume average particle size as measured by dynamic light scattering in the range of from 100 nm to 350 nm.

As used herein, the term "alkylene oxide polymer" refers to water-soluble polyethylene oxide polymers, as well as water-soluble polyethylene oxide/polypropylene oxide and polyethylene oxide/polybutylene oxide copolymers. Preferably, the alkylene oxide polymer is an alkylene oxide urethane polymer, more preferably an ethylene oxide urethane polymer.

The preferred hydrophobically modified alkylene oxide urethane polymer (HEUR) is conveniently prepared by contacting under suitable reactive conditions, a) a water-soluble polyalkylene glycol; b) a stoichiometric excess of a diisocyanate relative to the polyalkylene glycol; and c) a hydrophobic compound to form the hydrophobically modified alkylene oxide urethane polymer. Component b) may also be dichloromethane, dibromomethane, epichlorohydrin, or an aminoplast instead of a diisocyanate. The hydrophobic compound is defined by Stucture Ia

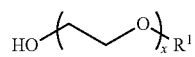

where R and x are as previously defined. $R^1$ is preferably in the range of $C_{10}$-$C_{28}$-alkyl; and x is preferably in the range of from 10, to 100, more preferably to 50, and most preferably to 32.

The $M_w$ of the HEUR is preferably in the range of from 40,000 to 100,000 g/mol, more preferably to 75,000. The weight-to-weight ratio of the imbibed thermoplastic polymer particles to the hydrophobically modified alkylene oxide urethane copolymer is preferably in the range of from 30:1, to 100:1.

A water-soluble polyalkylene glycol refers to water-soluble polyethylene oxides, water-soluble polyethylene oxide/polypropylene oxide copolymers, and water-soluble polyethylene oxide/polybutylene oxide copolymers. Preferred water-soluble polyalkylene oxides are polyethylene glycols, particularly polyethylene glycols having $M_w$ in the range of from 4000, more preferably from 6000, and most preferably from 7000 g/mol, to 20,000, more preferably to 12,000 and most preferably to 9000 g/mol. A commercially available polyethylene glycol is CARBOWAX™ 8000 Polyethylene Glycol (PEG 8000, a trademark of Dow, Inc. or an affiliate thereof).

Examples of diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, and m- and p-phenylene diisocyanates.

The composition of the present invention can be prepared by combining separate components of a 2K system, one of which comprises a) the aqueous dispersion of imbibed thermoplastic polymer particles and the other which comprises b) the hydrophobically modified alkylene oxide polymer and a curing agent. Alternatively, the composition can be prepared by combining one component that comprises a) the aqueous dispersion of imbibed thermoplastic polymer particles and the hydrophobically modified alkylene oxide polymer, and the other which comprises b) the curing agent.

The curing agent includes amines, amidoamines, hydrazine, anhydrides, isocyanates, phenolic resins, polyamides, and polymercaptans. Examples of suitable curing agents include diethylenetriamine, triethylenetetramine, tetraethylene-pentamine, 2,2,4-trimethylhexamethylenediamine, 2,4,4-trimethylhexamethylenediamine, 1,6-hexanediamine, 1-ethyl-1,3-propanediamine, bis(3-aminopropyl) piperazine, N-aminoethylpiperazine, N,N-bis(3-aminopropyl)ethylenediamine, 2,4-toluenediamine, 2,6-toluenediamine, 1,2-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophorone-diamine, norboranediamine, 4,4'-diaminodicyclohexylmethane, 4,4'-diaminodicyclohexylmethane, 4,4'-diaminodicyclohexyl-propane, 2,2-bis(4-aminocyclohexyl) propane, 3,3'-dimethyl-4,4'-diaminodicyclohexylmethane, 3-amino-1-cyclohexane-amino-propane, 1,3- and 1,4-bis (aminomethyl)cyclohexane, m-xylylenediamine, p-xylylenediamine, polyoxypropylenediamines, polyamidoamines, and aminoplast resins formed by the reaction of ureas and melamines with aldehydes.

Commercial examples of water-compatible curing agents include Epi-cure 8535, 8536, 8537, 8290 and 8292 curing agents; Anquamine 401 curing agent; Casamid 360 and 362 curing agents; Epilink 381 curing agent, DP660 curing agent, Hardener HZ350, 92-113, and 92-116; Beckopox EH659W, EH623W, VEH2133W curing agents; and Epotuf 37-680 and 37-681 curing agents.

The composition of the present invention is useful as part of a 2K system that gives improved Brookfield viscosity (and, therefore, improved sag resistance) without compromising KU viscosity. The combined 2K system advantageously include additional materials such as solvents, surfactants, dispersants, neutralizers, defoamers, colorants, pigments, extenders, biocides, and additional thickening agents.

EXAMPLES

Intermediate Example 1—Preparation of a HEUR Modified with a Stearyl Alcohol Ethoxylate A mixture of CARBOWAX™ 8000 Polyethylene Glycol (PEG 8000, A Trademark of Dow, Inc., 150 g) and toluene (400 g) were added to a vessel and dried by azeotropic distillation. The mixture was cooled to 90° C. and Desmodur W HMDI (Des W, 6.21 g) was added to the mixture with stirring for 5 min. Dibutyltin dilaurate (0.21 g) was then added to the mixture, which was stirred for 1 h, then cooled to 80° C. Ethal SA-20 ethoxylated stearyl alcohol with 20 ethylene oxide units per molecule (Ethal SA-20, 17.27 g) was added to the mixture and stirring was continued for an additional 1 h. The mixture was cooled to 60° C. and the polymer was isolated in vacuo. The dried polymer was then dissolved in a water/butyl carbitol mixture at 15 wt % solids.

Intermediate Example 2—Preparation of a HEUR Modified with a Behenyl Alcohol Ethoxylate The procedure of Intermediate Example 1 was followed except that Ethal BA-25 ethoxylated behenyl alcohol with 25 units of ethylene oxide per molecule (BA-25, 21.81 g) was used in place of Ethal SA-20.

Intermediate Example 3—Preparation of a High Molecular Weight HEUR Modified with a Behenyl Alcohol Ethoxylate The procedure of Intermediate Example 1 was followed except that Des W (5.40 g) and Desmodur N3600 HDI trimer (Des N3600, 0.69 g) were used as diisocyanates, and BA-25 (18.97 g) was used in place of Ethal SA-20.

Intermediate Example 4—Preparation of a HEUR Modified with a Stearyl Alcohol Ethoxylate The procedure of Intermediate Example 1 was followed except that BRIJ S10 ethoxylated stearyl alcohol 10 ethylene oxide units per molecular (Brij S10, 6.69 g) was used in place of Ethal SA-20.

Intermediate Example 5—Preparation of a HEUR Modified with a Lauryl Alcohol Ethoxylate The procedure of Intermediate Example 1 was followed except that Ethal LA-23 ethoxylated lauryl alcohol with 23 ethylene oxide units per molecule (Ethal LA-23, 7.62 g) was used in place of Ethal SA-20.

Comparative Intermediate Example 1—Preparation of a HEUR Modified with Octadecanol The procedure of Intermediate Example 1 was followed except that n-octadecanol (4.08 g) was used in place of Ethal SA-20.

Comparative Intermediate Example 2—Preparation of a Low Molecular Weight HEUR Modified with Stearyl Alcohol Ethoxylate The procedure of Intermediate Example 1 was followed except that increased quantities of Des W (10.05 g) and Ethal SA-20 (53.46 g) were used in the preparation.

Comparative Intermediate Example 3—Low Molecular Weight HEUR Modified with Behenyl Alcohol Ethoxylate The procedure of Intermediate Example 1 was followed except that an increased amount of Des W (10.05 g) was used and BA-25 (63.14 g) was used in place of Ethal SA-20.

Table 1 shows the materials and amounts used in Parts A and B of the two-component system. In the following table, DOWANOL, Butyl CARBITOL, ECOSURF, TAMOL, MAINCOTE, and ACRYSOL are Trademarks of Dow, Inc.

TABLE 1

| Parts A and B of the 2K Coating System | |
|---|---|
| Ingredients | Wt(g) |
| Part A | |
| Water | 67.31 |
| Sodium Nitrite Aqueous Solution (15%) | 8.67 |
| Anquamine 721 Curing Agent | 102.44 |
| DOWANOL ™ PnB glycol ether | 8.18 |
| Butyl CARBITOL ™ glycol ether | 8.18 |
| ECOSURF ™ EH-9 Surfactant | 2.14 |
| TAMOL ™ 731A Dispersant | 8.99 |
| Aqueous Ammonia (28%) | 0.82 |
| DISPERBYK-194 N Dispersant | 16.87 |
| BYK-019 Defoamer | 1.54 |
| Novocolor 11 8892N LB Universal Colorants | 9.78 |
| Ti-Pure R-706 titanium dioxide | 203.71 |
| Imsil A-10 silica filler | 16.87 |
| Optifilm Enhancer 400 coalescent | 5.65 |
| HEUR (15% solids) | 27.61 |
| Water | 52.50 |
| Total Part A | 541.26 |
| Part B | |
| MAINCOTE ™ AEH-10 Resin (52% solids) | 437.32 |
| Aqueous Ammonia (28%) | 0.29 |
| Tego Airex 902W deaerator emulsion | 1.45 |
| Water | 54.16 |
| ACRYSOL ™ RM-8W Rheology Modifier | 1.03 |
| Total Part B | 494.25 |
| Totals Part A and B | 1035.51 |

The total pigment volume concentration for Parts A and B was 19% and the total volume solids was 38%. Sag resistance was determined according to the ASTM D4400 (Standard Test Method for Sag Resistance in Paints Using a Multinotch Applicator).

$M_w$ of the HEUR polymers were determined by size exclusion chromatography as follows: Samples were prepared by dissolving 1-2 mg of polymer/g of 100 mM ammonium acetate in methanol. Samples were brought into solution by shaking overnight on a mechanical shaker at room temperature. Sample solutions were filtered using 0.45 μm PTFE filter.

Separations were carried out on a Waters Acquity APC system consisting of an isocratic pump, degasser, injector, column oven and both UV and RI detectors operated at 40° C. System control, data acquisition, and data processing were performed using version 3 of Empower software (Waters, Milford, Mass.). SEC separations were performed in 100 mM ammonium acetate in methanol (Optima grade from Fisher) at 0.5 mL/min using an APC column set composed of two Water APC columns (150×4.6 mm ID) packed with BEH Diol particles (pore size marked as BEH 200 Å and BEH 450 Å, particle size 1.7 μm and 2.5 μm, respectively) purchased from Waters (Milford, Mass.). 20 μL of sample were injected for APC separations. A 12-point calibration curve of $3^{rd}$ order was obtained from narrow polyethylene oxide (PEO) standards. Table 2 shows the $M_w$ of the intermediate HEURs, as well as KU viscosity, Brookfield viscosity (spindle LV#3, rpm=6; 25° C. (BF 3/6)), and Sag resistance (Sag) of the 2K system after mixing together Parts A and B for 5 min.

TABLE 2

$M_w$, Viscosity, and Sag of 2K Coating System vs. HEUR Type

| Int. Ex. No. | $M_w$ | 5 min mix | | |
|---|---|---|---|---|
| | | KU | BF (3/6) (cps) | Sag (mils) |
| 1 | 53,969 | 77.8 | 6359 | 22 |
| 2 | 46,382 | 77.2 | 6611 | ≥24 |
| 3 | 174,260 | 83 | 8238 | ≥24 |
| 4 | 47,104 | 75.1 | 4379 | 14 |
| 5 | 56,208 | 78 | 5859 | 22 |
| Comp. 1 | 43,000 | 75.4 | 919 | 6 |
| Comp. 2 | 25,194 | 75.6 | 1020 | 8 |
| Comp. 3 | 24,492 | 78.2 | 3030 | 12 |

The data suggest the criticality of $M_w$ as well as the composition of the HEUR hydrophobe as it relates to Brookfield viscosity and Sag of the 2K coating system. Notably, the KU viscosity is advantageously unaffected by the improvement in Brookfield viscosity and Sag.

The invention claimed is:

1. A composition comprising a) an aqueous dispersion of thermoplastic polymer particles imbibed with a thermosettable compound having at least two oxirane groups, which polymer particles are functionalized with from 0.1 to 5 weight percent structural units of an anti-agglomerating monomer; and b) a hydrophobically modified alkylene oxide polymer having a hydrophobic portion characterized by the following group:

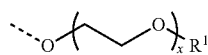

I where $R^1$ is $C_8$-$C_{32}$-alkyl; and x is from 10 to 200; and wherein the hydrophobically modified alkylene oxide copolymer has a weight average molecular weight ($M_w$) in the range of from 40,000 to 200,000 g/mol; wherein when the composition comprises the imbibed thermoplastic polymer particles, the weight-to-weight ratio of the imbibed thermoplastic polymer particles to the hydrophobically modified alkylene oxide copolymer is in the range of from 10:1 to 200:1.

2. The composition of claim 1 wherein the concentration of the thermosettable compound imbibed in the thermoplastic polymer particles is in the range of from 20 to 60 weight percent, based on the weight of the thermoplastic polymer particles and the thermosettable compound.

3. The composition of claim 2 wherein the hydrophobically modified alkylene oxide polymer is a hydrophobically modified ethylene oxide urethane polymer, and the thermoplastic polymer particles are acrylate or styrene acrylate copolymers, wherein the imbibed thermosettable compound has two oxirane groups.

4. The composition of claim 3 wherein the anti-agglomerating monomer is a sulfur acid monomer or a salt thereof; a phosphorus acid monomer or a salt thereof; an acrylamide monomer; or an acetoacetoxy containing monomer.

5. The composition of claim 4 wherein the anti-agglomerating monomer is phosphoethyl methacrylate.

6. The composition of claim 5 wherein the hydrophobically modified ethylene oxide urethane polymer has an $M_w$ in the range of from 40,000 to 100,000 g/mol; and wherein the hydrophobic portion is represented by the following structure:

I where $R^1$ is $C_{10}$-$C_{28}$-alkyl; and x is in the range of from 10 to 50.

7. The composition of claim 1 which comprises the imbibed thermoplastic polymer particles and a curing agent.

8. The composition of claim 7 wherein:
a) the hydrophobically modified alkylene oxide polymer is a hydrophobically modified ethylene oxide urethane polymer;
b) the thermoplastic polymer particles are acrylate or styrene acrylate copolymers, wherein the imbibed thermosettable compound has two oxirane groups;
c) the concentration of the thermosettable compound imbibed in the thermoplastic polymer particles is in the range of from 20 to 60 weight percent, based on the weight of the thermoplastic polymer particles and the thermosettable compound
d) the anti-agglomerating monomer is phosphoethyl methacrylate; and
e) the hydrophobic portion of the hydrophobically modified ethylene oxide urethane polymer is represented by the following structure:

I where $R^1$ is $C_{10}$-$C_{28}$-alkyl; and x is in the range of from 10 to 32.

9. The composition of claim 8 which further comprises a solvent, a surfactant, a dispersant, a defoamer, a colorant, a pigment, and an extender.

10. The composition of claim 7 which further comprises a material selected from the group consisting of a solvent, a surfactant, a dispersant, a defoamer, a colorant, a pigment, and an extender.

* * * * *